J. B. MILLER, dec'd.

Assignor, by mesne assignments, to H. W. PUTNAM.

Bottle-Stopper.

No. 9,002. Reissued Dec. 23, 1879.

Witnesses:

John C. Trumbridge.
Willy G. S. Schultz.

Inventor:

Henry W. Putnam
Assignee of Joel B. Miller, Dec.
by his attorney
A. v. Briesen

THE NORRIS PETERS CO., PHOTO-LITHO., WASHINGTON, D. C.

UNITED STATES PATENT OFFICE.

HENRY W. PUTNAM, OF BENNINGTON, VERMONT, ASSIGNEE, BY MESNE ASSIGNMENTS, OF JOEL B. MILLER, DECEASED.

IMPROVEMENT IN BOTTLE-STOPPERS.

Specification forming part of Letters Patent No. 156,302, dated October 27, 1874; Reissue No. 9,002, dated December 23, 1879; application filed October 30, 1879.

*To all whom it may concern:*

Be it known that JOEL B. MILLER, of Rondout, in the county of Ulster and State of New York, did invent a new and useful Improvement in Bottle-Stoppers, of which the following is a specification.

This invention relates to that class of bottle-stoppers which are located within the bottles, jugs, or vials, to close the mouth of the same from below; and it consists of a spring bail and handle permanently attached to the upper end of such internal stopper, by means of which bail and handle the cork or stopper is removed from and fastened in the throat of the bottle, and properly held in place throughout.

Figure 1:
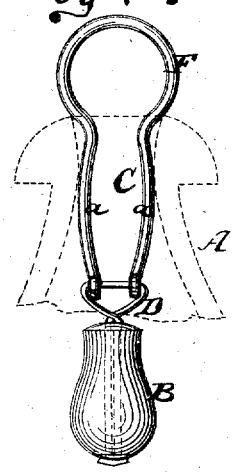
Figure 2:
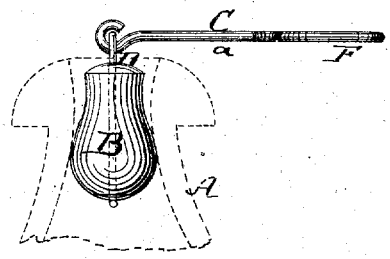

Figure 1 is a side view of the improved stopper, showing it suspended into an open bottle. Fig. 2 is an edge view of the same, showing it drawn up to close the bottle.

A represents the bottle; B, the stopper; C, the spring attachment or bail. D is a wire or rod, which is substantially attached in any manner to the stopper, and which forms a loop or eye, or a similar device, at its upper end, to which the spring attachment or bail C is fastened. The said bail C may be of any suitable shape; but an eye or handle, F, larger in diameter at its lower part than the throat of the bottle, is formed on or a cross attached to its upper end, to prevent it from slipping into the bottle. The body of the bail is preferably staple-shaped, being made of two legs or branches, *a a*, which bow outward so as to form springs, which bear against the sides of the throat of the bottle.

To fill or empty the bottle the stopper is forced down and suspended from the eye F, as shown in Fig. 1. For closing the bottle the stopper is drawn up, as in Fig. 2. The springs *a a*, formed by making the bail of a bow shape, or with two legs or branches, will, owing to their elasticity, spring against the throat of the bottle, so as to render the casual displacement of the stopper impossible.

The stopper is forced down and raised up for opening and closing the bottle with perfect ease, the peculiar form of bail and handle greatly facilitating the opening and closing of the bottle.

By hinging or jointing the bail to the stopper as shown, the same can be turned away from the mouth of the bottle, as indicated in Fig. 2.

What is claimed is—

1. The combination of an internal bottle-stopper with an upwardly-projecting bail, C, said bail having an enlargement, F, which is adapted to suspend the stopper from the mouth of the bottle, and a handle portion above said enlargement, substantially as herein shown and described.

2. The combination of an internal bottle-stopper with a bail, C, which is constructed to form springs *a a* above the stopper, substantially as herein shown and described.

3. The combination of an internal bottle-stopper with a bail, C, forming the springs *a*, and the enlargement F above said springs, substantially as herein shown and described.

4. The internal bottle-stopper provided with a hinged or jointed bail, C, which is composed of two elastic legs or branches, *a*, and of an eye or finger-loop, substantially as herein shown and described.

HENRY W. PUTNAM.

Witnesses:
WILLY G. E. SCHULTZ,
TOMPSON B. MOSHER.